United States Patent
Lalam

(10) Patent No.: US 10,912,122 B2
(45) Date of Patent: Feb. 2, 2021

(54) METHOD FOR COORDINATED RANDOM ACCESS TO A WIRELESS COMMUNICATION NETWORK

(71) Applicant: SAGEMCOM BROADBAND SAS, Rueil Malmaison (FR)

(72) Inventor: Massinissa Lalam, Rueil Malmaison (FR)

(73) Assignee: SAGEMCOM BROADBAND SAS, Rueil Malmaison (FR)

(*) Notice: Subject to any disclaimer, the term of this patent is extended or adjusted under 35 U.S.C. 154(b) by 11 days.

(21) Appl. No.: 16/332,244

(22) PCT Filed: Sep. 8, 2017

(86) PCT No.: PCT/EP2017/072572
§ 371 (c)(1),
(2) Date: Mar. 11, 2019

(87) PCT Pub. No.: WO2018/046657
PCT Pub. Date: Mar. 15, 2018

(65) Prior Publication Data
US 2019/0215873 A1    Jul. 11, 2019

(30) Foreign Application Priority Data
Sep. 12, 2016 (FR) ..................... 16 58468

(51) Int. Cl.
*H04W 4/00* (2018.01)
*H04W 74/08* (2009.01)
(Continued)

(52) U.S. Cl.
CPC ....... *H04W 74/0833* (2013.01); *H04W 72/02* (2013.01); *H04W 72/042* (2013.01);
(Continued)

(58) Field of Classification Search
CPC ............ H04W 74/0833; H04W 72/02; H04W 72/042; H04W 72/0453; H04W 74/006;
(Continued)

(56) References Cited

U.S. PATENT DOCUMENTS

2016/0143006 A1* 5/2016 Ghosh ................ H04W 74/004
  370/329
2017/0019863 A1* 1/2017 Cariou ................ H04W 52/146
(Continued)

FOREIGN PATENT DOCUMENTS

WO    2016/126370 A1    8/2016

OTHER PUBLICATIONS

Nov. 10, 2017 International Search Report issued in International Patent Application No. PCT/EP2017/072572.
(Continued)

*Primary Examiner* — Mang Hang Yeung
(74) *Attorney, Agent, or Firm* — Oliff PLC; R. Brian Drozd

(57) ABSTRACT

An access point of a wireless communication network to which a plurality of terminals are connected transmits frames triggering coordinated random access procedure, thus offering an opportunity of access to the medium of the wireless communication network for each terminal for which this frame is intended. Each terminal that seizes the opportunity for access to the medium performs an OFDMA uplink transmission in response to said frame. The access point includes (303, 308), in each frame triggering coordinated random access procedure, information representing a frequency resource selection method among a random selection method and a free selection method.

15 Claims, 5 Drawing Sheets

(51) Int. Cl.
*H04W 72/02* (2009.01)
*H04W 72/04* (2009.01)
*H04W 74/00* (2009.01)
*H04W 84/12* (2009.01)

(52) U.S. Cl.
CPC ..... *H04W 72/0453* (2013.01); *H04W 74/006* (2013.01); *H04W 74/008* (2013.01); *H04W 74/0891* (2013.01); *H04W 74/08* (2013.01); *H04W 84/12* (2013.01)

(58) Field of Classification Search
CPC ........... H04W 74/008; H04W 74/0891; H04W 84/12; H04W 74/08
USPC .......................................................... 370/329
See application file for complete search history.

(56) References Cited

U.S. PATENT DOCUMENTS

| | | | |
|---|---|---|---|
| 2017/0195954 A1* | 7/2017 | Ghosh | H04W 28/0221 |
| 2018/0069677 A1* | 3/2018 | Cherian | H04L 1/1614 |
| 2018/0139699 A1* | 5/2018 | Choi | H04W 48/02 |
| 2018/0146476 A1* | 5/2018 | Kim | H04W 74/0841 |
| 2018/0310338 A1* | 10/2018 | Li | H04L 5/0094 |
| 2018/0317262 A1* | 11/2018 | Yang | H04W 74/0833 |
| 2018/0332540 A1* | 11/2018 | Lou | H04W 52/10 |
| 2019/0150090 A1* | 5/2019 | Yang | H04W 72/1289 370/311 |

OTHER PUBLICATIONS

Ryu et al; "UL MU Procedure;" Presentation at LG Electronics; Mar. 9, 2015.
Ryu et al; "Trigger type specific information;" Presentation at LG; Nov. 8, 2015.

* cited by examiner

METHOD FOR COORDINATED RANDOM ACCESS TO A WIRELESS COMMUNICATION NETWORK

The present invention relates to procedures for coordinated random access to a medium of a wireless communication network, in which OFDMA ("orthogonal frequency division multiple access") uplink transmissions are made.

The technology of multiple access to a medium by orthogonal frequency division (OFDMA) is widespread in the field of wireless communication networks. It is found in particular in the field of $4^{th}$ generation (4G) mobile telephony networks for making downlink communications from base stations, referred to as "eNodeB", to terminals referred to as "UE" (user equipment).

OFDMA technology is also envisaged both for downlink communications and for uplink communications in the context of IEEE 802.11ax. See in particular the document "*IEEE P802.11ax/Draft* 2, March 2016". In particular, a coordinated random access procedure using OFDMA technology was proposed, with regard to certain uplink communications, in the document "*UL OFDMA-based Random Access Procedure, IEEE* 802.11-15/1105r0, September 2015". This coordinated random access procedure is envisaged for optimising the use of radio power for terminals at the limit of radio range and/or for terminals with limited transmission capacities, as is the case generally in the context of the Internet of Things (IoT). The coordinated random access procedure also enables scheduling access to the medium for controlling competing accesses to the medium in particular with regard to control messages such as probe requests or association requests or the traffic related to the Internet of Things IoT for terminals communicating little information and/or sporadically. This procedure is referred to as random access since it is triggered by an access point that does not know which terminals to which said procedure relates will actually seize the opportunity for transmission offered by said procedure. This procedure is said to be coordinated access since it is managed in a centralised manner by this access point, which decides to which terminals and when the transmission opportunity is offered.

In order to trigger the coordinated random access procedure vis-à-vis uplink communications in IEEE 802.11ax, an access point (AP) transmits to one or more terminals, also referred to as stations, a trigger frame for random access (TF-R). The coordinated random access trigger frame TF-R can be transmitted in unicast mode, in multicast mode or in broadcast mode, according to the terminal or terminals to which the access point AP wishes to provide an opportunity for access to the medium. The coordinated random access trigger frame TF-R defines which frequency resources (also referred to as "resource units" (RU) are candidates for making OFDMA uplink transmissions in the context of the coordinated random access initiated by said coordinated random access trigger frame TF-R. Each frequency resource is a predefined and unique set of a plurality of subcarriers, each subcarrier being able to belong to only one frequency resource thus defined. A terminal wishing to seize an opportunity offered in the context of the coordinated random access initiated by said coordinated random access trigger frame TF-R manages a counter, referred to as an OBO (OFDMA backoff) counter, initialised with an integer value chosen randomly in a contention window (CW). When said terminal receives a coordinated random access trigger frame TF-R that is addressed to it, said mobile terminal runs through said coordinated random access trigger frame TF-R in order to identify a list of frequency resource or resources that the access point AP enables it to use, and decrements its OBO counter by a number of units equal to the cardinality of said list of frequency resource or resources without however becoming negative. When the OBO counter becomes zero, said terminal chooses randomly a frequency resource among those that are enabled for it by the coordinated random access trigger frame TF-R; if the OBO counter remains strictly positive, said terminal waits to receive a new coordinated random access trigger frame TF-R in order to reiterate the aforementioned operations and to determine whether said terminal can perform an OFDMA uplink transmission in the context of the coordinated random access procedure. In the case of a successful uplink transmission (an acknowledgement of said transmission received on a downlink channel coming from the access point A), the terminal wishing to seize once again an opportunity offered in the context of coordinated random access once again initializes its OBO counter with an integer value chosen randomly in a new contention window CW, the size of which is different from that used previously. For example, the size of the new contention window CW may be initialised to a minimum value.

In the case of an unsuccessful uplink transmission (no acknowledgement received on a downlink channel from the access point AP), the terminal can once again initialise its OBO counter with an integer value chosen randomly in a new contention window CW, the size of which may also be different. For example, the size of the new contention window CW may be increased exponentially to a maximum value at each unsuccessful (non-acknowledged) attempt at uplink transmission.

The above mechanism allows guaranteeing a certain fairness of access to the wireless communication network medium between the various terminals that are connected thereto. This approach does however suffer from a lack of performance, in particular vis-à-vis terminals at the limit of radio range and/or those having small radio transmission capacities.

It is desirable to overcome these drawbacks of the prior art.

The invention relates to a method implemented by an access point of a wireless communication network to which a plurality of terminals are connected, the access point transmitting in the wireless communication network frames triggering a coordinated random access procedure, each frame triggering coordinated random access procedure offering an opportunity for access to the medium of said wireless communication network to each terminal for which said frame is intended, each terminal that seizes said opportunity for access to the medium performing an OFDMA uplink transmission toward said access point in response to said frame. The method is such that the access point includes, in each frame triggering coordinated random access procedure, information representing a method of selecting a frequency resource, chosen by said access point according to a predefined policy, among the following two: a random selection method, according to which each terminal concerned is supposed to randomly select a frequency resource among a set of candidate frequency resources submitted by said access point in said frame triggering coordinated random access procedure; and a free selection method, according to which each terminal concerned is supposed to freely select a frequency resource among a set of candidate frequency resources submitted by said access point in said frame triggering coordinated random access procedure. Thus, by virtue of the choice offered by the two frequency resource selection methods for performing OFDMA uplink transmissions, a trade-off between fairness of access to the medium of the wireless communication network and performance of the transmissions, in particular for terminals at the edge of radio range and/or those having low radio-transmission capacities, can be found.

According to a particular embodiment, the access point further includes, in each frame triggering coordinated random access procedure, information representing a power of transmission of said frame by said access point. This enables the terminals to use said frame triggering coordinated random access procedure to dynamically determine an attenuation level to which said frame is subjected during transmission thereof.

According to a particular embodiment, the access point further includes, in each frame triggering coordinated random access procedure, information representing a transmission power expected by said access point in receiving each OFDMA uplink transmission made in response to said frame. This enables the terminals to use said frame triggering coordinated random access procedure in order to dynamically determine a transmission power to be used for each OFDMA uplink transmission performed in response to said frame.

According to a particular embodiment, the access point transmits each frame triggering coordinated random access procedure at least via the candidate frequency resources submitted in said frame and among which the terminals for which said frame is intended are supposed to perform the frequency resource selection in order to perform the OFDMA uplink transmissions in response to said frame. Thus said frame triggering coordinated random access procedure suffices for the terminals to dynamically determine the transmission power to be used on each candidate frequency resource for the OFDMA uplink transmission performed in response to said frame.

According to a particular embodiment, the access point further includes, in each frame triggering coordinated random access procedure, information representing the least robust modulation and coding scheme allowed by said access point for performing each OFDMA uplink transmission in response to said frame. Thus the terminals may take into account said information representing the modulation and coding scheme for freely selecting the frequency resources to be used respectively for performing the OFDMA uplink transmissions in response to said frame.

According to a particular embodiment, the access point collects first statistics relating to the resources selected by said mobile terminals for performing the OFDMA uplink transmissions in response to the frames triggering coordinated random access procedure which include information representing the free selection method. This enables the access point to know which frequency resources are favoured by the terminals when they are not forced to randomly choose the frequency resource to use.

According to a particular embodiment, the access point determines the candidate frequency resources submitted in each frame triggering coordinated random access procedure, according to said first statistics collected vis-à-vis terminals for which said frame triggering coordinated random access procedure is intended. This enables increasing performance of the wireless communication network by submitting candidate frequency resources that suit the terminals overall.

According to a particular embodiment, the access point performs a grouping of terminals for which a frame triggering coordinated random access procedure is intended, according to said first statistics collected vis-à-vis terminals connected to the wireless communication network. This enables increasing performance of the wireless communication network by making groupings that limit the risks of collision arising when at least two terminals choose the same frequency resource for the same opportunity for access to the medium.

According to a particular embodiment, the access point collects second statistics relating to the resources selected by said terminals for performing the OFDMA uplink transmissions in response to the frames triggering coordinated random access procedure which include information representing the random selection method. This enables classifying the terminals according to their behaviour vis-à-vis the performances of the wireless communication network, and to act accordingly.

According to a particular embodiment, the access point checks that the selections of frequency resources for performing the OFDMA uplink transmissions in response to the frames triggering coordinated random access procedure which include information representing the random selection method actually have a random character. This enables detecting terminals that impair the performance of the wireless communication network by using a biased random generator, and taking suitable countermeasures.

According to a particular embodiment, the access point further includes, in each frame triggering coordinated random access procedure for which the access point has chosen the free selection method, information representing a selection rule, among a predefined set of selection rules, that each terminal concerned is supposed to apply for freely selecting a said frequency resource among the set of candidate frequency resources submitted by said access point in said frame triggering coordinated random access procedure. Thus the access point can guide the terminals in order to increase the performances of the wireless communication network, while leaving a certain freedom for the terminals to choose the frequency resources that best suit them for performing the OFDMA uplink transmissions in response to said frame.

According to a particular embodiment, the access point indicates, in beacons sent by the access point for synchronising the wireless communication network, that the access point is able to trigger coordinated random access procedures.

According to a particular embodiment, the access point indicates, in the beacons sent by the access point for synchronising the wireless communication network, information representing future instants of transmission of a frame triggering coordinated random access procedure.

The invention also relates to an access point intended to manage a wireless communication network to which a plurality of terminals are connected, the access point being configured to transmit in the wireless communication network coordinated frames triggering random access procedure, each frame triggering coordinated random access procedure offering an opportunity for access to the medium of said wireless communication network to each terminal for which said frame is intended, each terminal that seizes said opportunity for access to the medium performing an OFDMA uplink transmission to said access point in response to said frame. The access point is configured to include, in each frame triggering coordinated random access procedure, information representing a frequency resource selection method, chosen by said access point according to a predefined policy, among the following two: a random selection method according to which each terminal concerned is supposed to randomly select a frequency resource among a set of candidate frequency resources submitted by said access point in said frame triggering coordinated random access procedure; and a free selection method, according to which each terminal concerned is supposed to freely select a frequency resource among a set of candidate frequency resources submitted by said access point in said frame triggering coordinated random access procedure.

The features of the invention mentioned above, as well as others, will emerge more clearly from a reading of the following description of an example embodiment, said description being given in relation to the accompanying drawings, among which:

Figure 6:
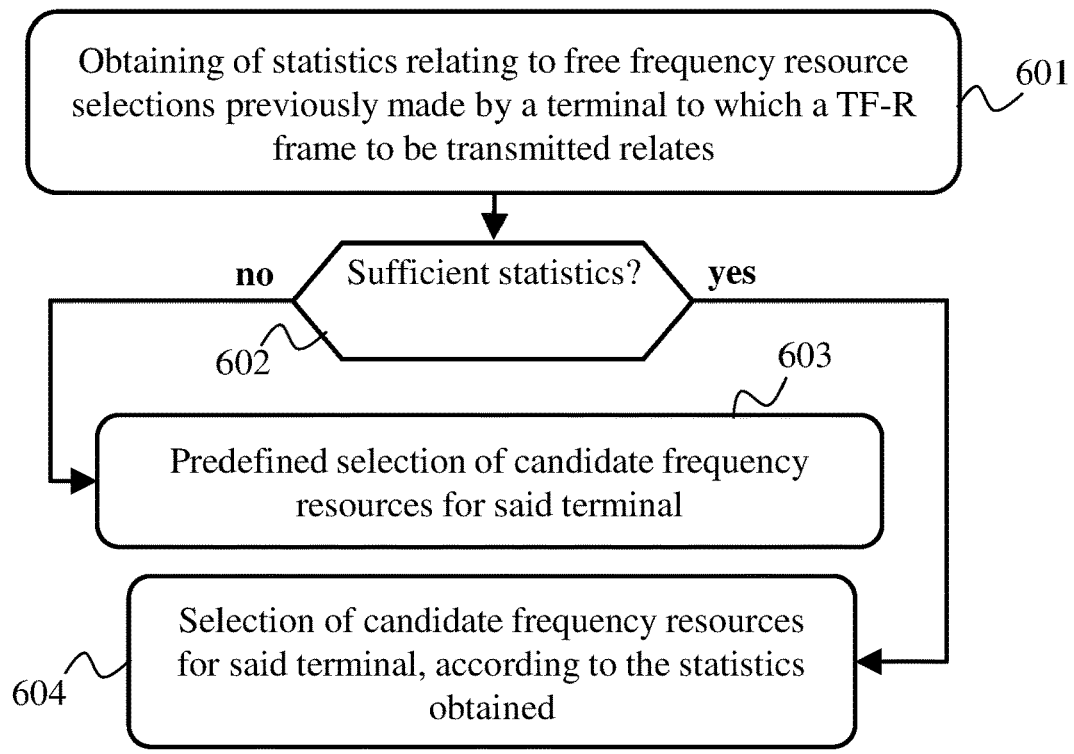
Figure 7:
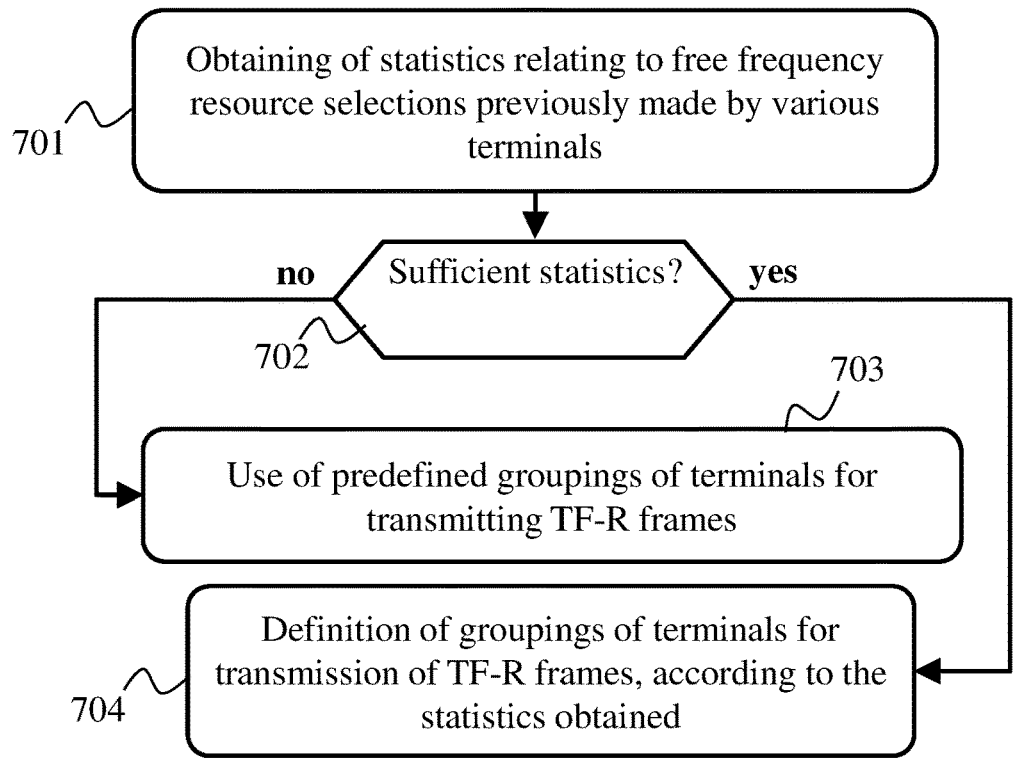

FIG. 6 illustrates schematically an algorithm, executed by the access point, for selecting candidate frequency resources for submitting to terminals of the wireless communication system in the context of the coordinated random access procedure; and FIG. 7 illustrates schematically an algorithm, executed by the access point, for effecting groupings of terminals in the wireless communication system in the context of the coordinated random access procedure.

Figure 1:
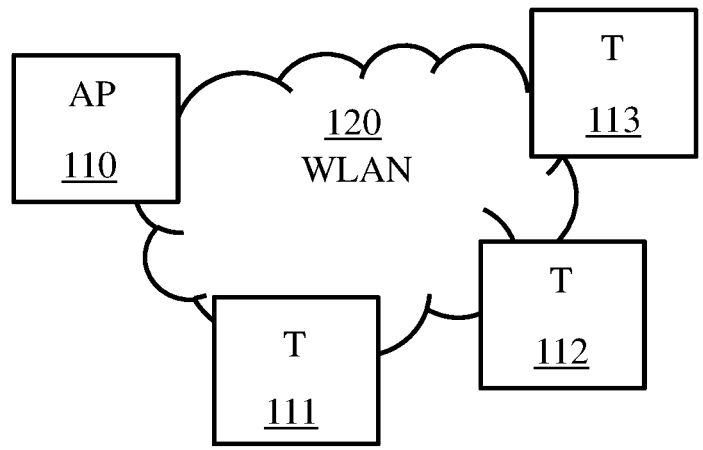
FIG. 1 illustrates schematically a wireless communication system in which the present invention can be implemented.

FIG. 1 illustrates schematically a wireless communication system in which the present invention can be implemented. The communication system comprises a wireless communication network 120, an access point AP 110 and a plurality of terminals T 111, 112, 113 connected to the wireless communication network 120. In a particular embodiment, the wireless communication network 120 is a WLAN (wireless local area network) local network, preferentially in accordance with the principals of the IEEE 802.11 family of standards (with the exception of the coordinated random access procedures, as described hereinafter in relation to FIGS. 3 to 7). In the context of the IEEE 802.11 family of standards, it is considered that a terminal T is connected to the wireless communication network 120 when said terminal T is capable of successfully authenticating itself (exchange of authentication frames) and associating itself (exchange of association—or re-association—frames) with the access point AP 110 via the wireless communication network 120 (the case of a private network), or when said terminal T is capable of successfully associating itself (exchange of association—or reassociation—frames) with the access point AP 110 (the case of an open network).

The access point AP 110 is responsible for managing the wireless communication network 120, for performing downlink communications to the terminals T 111, 112, 113 in order to transfer data and to enable the terminals T 111, 112, 113 to perform uplink transmissions to said access point AP 110 in order to transfer data thereto, at least some of which are OFDMA uplink transmissions. Uplink transmissions of other types, for example of the OFDM type, may therefore also be implemented in the wireless communication network 120, at other time intervals than the OFDMA uplink transmissions.

The communications in the wireless communication network 120 take place in reliance on a predefined set of frequency resources. Each frequency resource corresponds to a predefined group of a plurality of subcarriers, identified uniquely. For example, IEEE 802.11ax defines groups of subcarriers having at a minimum 26 subcarriers spaced apart by 78.125 kHz. The access point AP 110 supports the sending of a coordinated random access procedure trigger frame. The terminals T 111, 112, 113 support the reception of the coordinated random access procedure trigger frame and can implement said coordinated random access procedure on reception of said trigger frame.

Figure 2A:
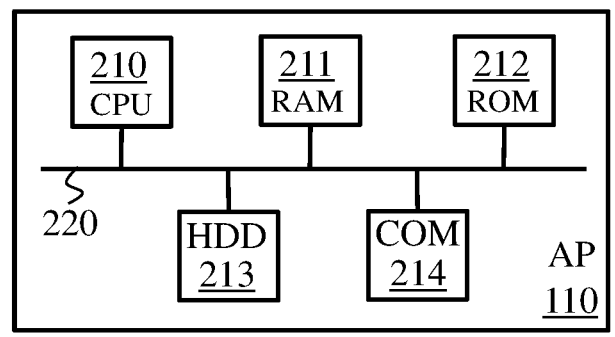
FIG. 2A illustrates schematically an example of hardware architecture of an access point of the wireless communication system.

FIG. 2A illustrates schematically an example of hardware architecture of the access point AP 110. The access point AP 110 then comprises, connected by a communication bus 220: a processor or CPU (central processing unit) 210; a random access memory (RAM) 211; a read only memory (ROM) 212; a storage unit or a storage medium reader, such as a hard disk drive (HDD) 213; and an interface 214 for managing the wireless communication network 120 and communicating with the terminals T 111, 112, 113 of the wireless communication network 120.

The processor 210 is capable of executing instructions loaded in the RAM 211 from the ROM 212, from an external memory (not shown), from a storage medium or from a communication network. When the access point AP 110 is powered up, the processor 210 is capable of reading instructions from the RAM 211 and executing them. These instructions form a computer program causing the implementation, by the processor 210, of all or some of the algorithms and steps described below in relation to the access point AP 110.

Thus all or some of the algorithms and steps described below in relation to the access point AP 110 can be implemented in software form by the execution of a set of instructions by a programmable machine, such as a DSP (digital signal processor) or a microcontroller, or in hardware form by a machine or a dedicated component, such as an FPGA (field-programmable gate array) or an ASIC (application-specific integrated circuit).

Figure 2B:
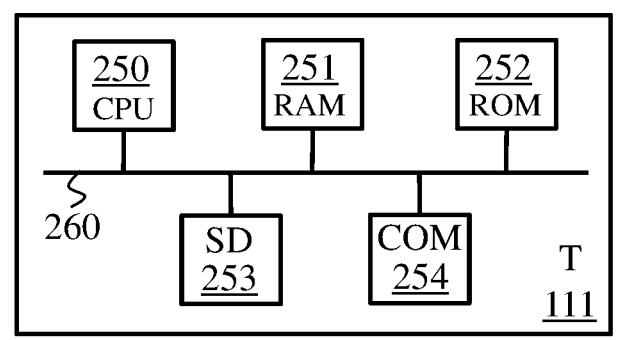
FIG. 2B illustrates schematically an example of hardware architecture of a mobile terminal of the wireless communication system.

FIG. 2B illustrates schematically an example of hardware architecture of a terminal configured to be able to communicate via the wireless communication network 120, such as the terminal T 111, 112 or 113. Let us consider by way of illustration that FIG. 2B shows schematically an example of hardware architecture of the terminal T 111. The terminal T 111 then comprises, connected by a communication bus 260: a processor or CPU 250; a random access memory RAM 251; a read-only memory ROM 252; a storage unit or a storage medium reader, such as an SD (secure digital) card reader 253; and an interface 254 for communicating via the wireless communication network 120.

The processor 250 is capable of executing instructions loaded into the RAM 251 from the ROM 252, from an external memory (not shown), from a storage medium, or from a communication network. When the terminal T 111 is powered up, the processor 250 is capable of reading instructions from the RAM 251 and executing them. These instructions form a computer program causing the implementation, by the processor 250, of all or some of the algorithms and steps described below in relation to the terminals T 111, 112, 113.

Thus all or some of the algorithms and steps described below in relation to the terminals T 111, 112, 113 can be implemented in software form by the execution of a set of instructions by a programmable machine, such as a DSP or a microprocessor, or in hardware form by a machine or a dedicated component, such as a FPGA or an ASIC.

Figure 3:
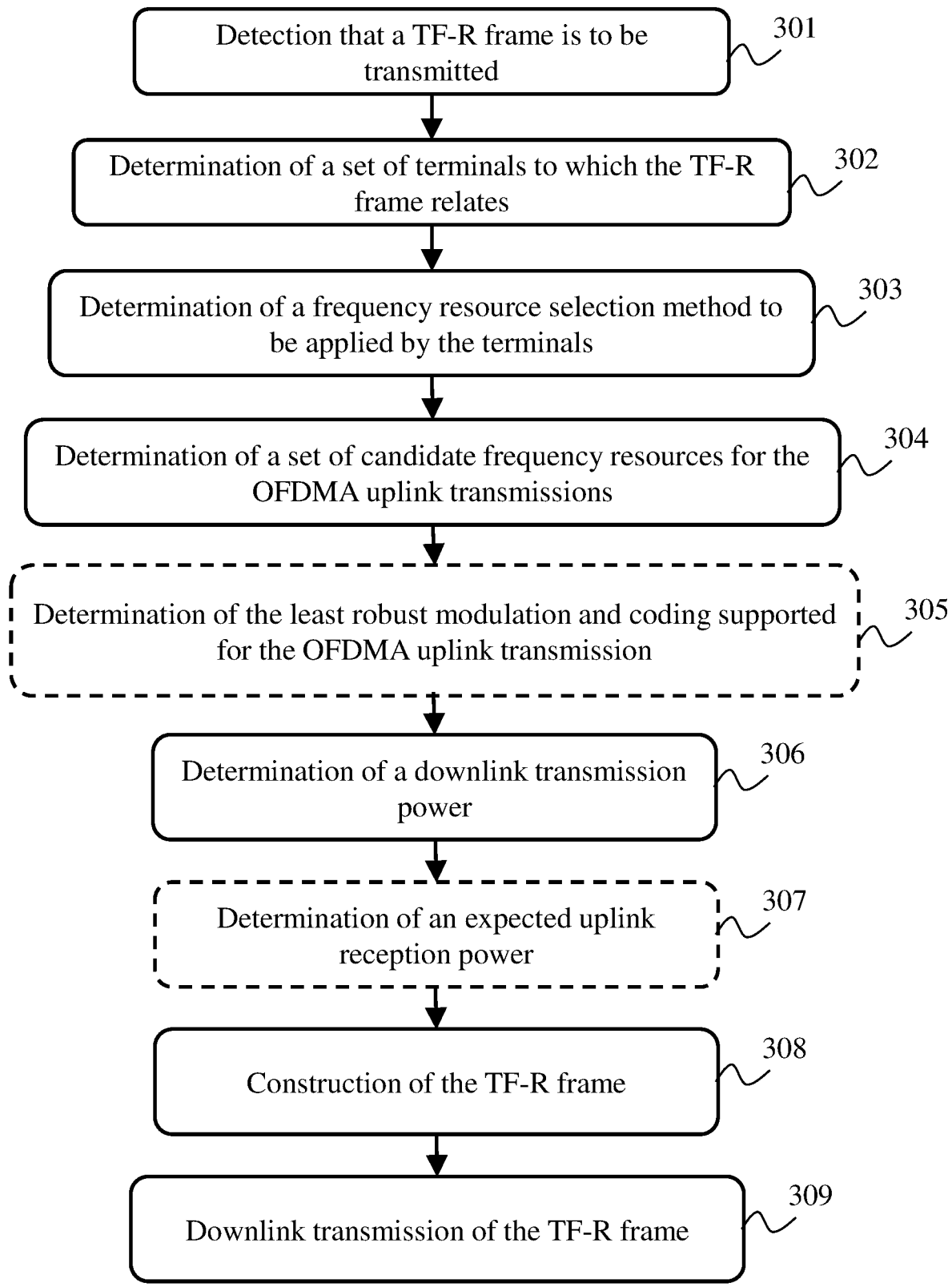
FIG. 3 illustrates schematically an algorithm, executed by the access point, for initiating a coordinated random access procedure.

FIG. 3 illustrates schematically an algorithm, executed by the access point AP 110, for initiating a coordinated random access procedure.

In a step 301, the access point AP 110 detects that a coordinated random access trigger frame TF-R is to be transmitted for initiating a procedure of coordinated random access to the medium of the wireless communication network 120. According to a first example, the access point AP 110 sends such a coordinated random access trigger frame TF-R at regular intervals, so as to time the accesses to the medium by, as time goes by, distributing (not necessarily fairly) the opportunities for access to the medium for each of the terminals T connected to the wireless communication network 120 and supporting the coordinated random access procedure, so that the coordinated random access procedures follow on from each other. According to a second example, the access point AP 110 sends such a coordinated random access trigger frame TF-R at instants resulting from a negotiation with terminals that have requested the establishment of this type of access. According to a third example, the access point AP 110 sends such coordinated random access trigger frames TF-R while leaving, between the coordinated random access procedures, intervals of time during which the mobile terminals connected to the wireless communication network 120 can attempt to access the medium on their own initiative, for example relying on transmissions of the OFDM (orthogonal frequency division multiplex) type and a medium-access technique of the CSMA/CA (carrier sense multiple access with collision avoidance) type. It should be noted that, in the latter case, all the frequency resources that can be used in the wireless communication network 120 are used by each mobile terminal T for effecting each uplink transmission, contrary to the principles prescribed by the OFDMA technology.

In a step 302, the access point AP 110 determines a set of terminals T, connected to the wireless communication network 120, to which the coordinated random access procedure that will be initiated by the coordinated random access trigger frame TF-R relates. The access point AP 110 distributes in time the opportunities for access to the medium (not necessarily strictly fairly, even if fairness is a typically important parameter in the planning of transmission opportunities) between at least some of the mobile terminals T connected to the wireless communication network 120. This approach for distribution of access to the medium is found in LTE (long-term evolution) telecommunication technology. The access point AP 110 can effect groupings of mobile terminals T enabled to attempt to access a medium at the same time in the context of the coordinated random access procedure by relying on statistics collected during previous coordinated random access procedures, so as to limit the risks of collision and/or interference caused. This aspect is detailed below in relation to FIG. 7.

In a step 303, the access point AP 110 determines a method for selecting frequency resources, which is to be applied by the terminals T for which the coordinated random access trigger frame TF-R is intended. The method for selecting frequency resources is chosen from the following two methods:

random selection method, according to which each of the terminals T randomly selects a frequency resource, to be used by said terminal T to perform an OFDMA uplink transmission in the context of the coordinated random access procedure, from a set of candidate frequency resources submitted by the access point AP 110; and free selection method, according to which each of the terminals T freely selects the frequency resource to be used by said terminal T to perform an OFDMA uplink transmission in the context of the coordinated random access procedure, from the set of candidate frequency resources submitted by the access point AP 110.

Applying the free selection method enables the access point AP 110 to give the opportunity to one or more terminals to succeed in making a short-term uplink transmission. This is because terminals T at the radio range limit or with low radio capacities may have great difficulties in making their uplink transmissions. Using OFDMA technology enables deriving the benefits of OFDM technology by concentrating the power on a small number of subcarriers, and the free selection method also, compared with the random selection method, enables the terminal to choose for example the frequency resource that has the least attenuation.

Applying the free selection method also enables the access point AP 110 to collect statistics as to the frequency resources preferentially used by the terminals T to perform the uplink transmissions and, by means of these statistics, to improve the transmission performances in the wireless communication network 120. Such statistics are dealt with below in relation to FIGS. 5, 6 and 7.

Applying the random selection method enables tending towards a certain fairness of access to the medium for said terminals T and to reduce the risks of successive collisions when several terminals T to which the random access procedure relates would have a tendency to use, if the choice is routinely left to them among the same frequency resources that can be used in the wireless communication network 120, in competition with the same frequency resources, for making their OFDMA uplink transmission.

The access point AP 110 performs the selection between the random selection method and the free selection method according to a predefined policy.

In a particular embodiment, the access point AP 110 uses by default the random selection method and selects the free selection method when a performance criterion of the communication network is not met. For example, the access point AP 110 decides to select the free selection method when said access point AP 110 notes that the frequency resources are being used below a predetermined threshold. According to another example, the access point AP 110 decides to select the free selection method when said access point AP 110 notes that at least one terminal T connected to the wireless communication network 120, in a given time window, has made a number of accesses to the medium of the wireless communication network 120 by means of the coordinated random access procedure that is below a predetermined threshold.

In a particular embodiment, the access point AP 110 uses by default the free selection method and selects the random selection method when a performance criterion of the communication network is met. For example, the access point AP 110 decides to select the random selection method when said access point AP 110 notes that the frequency resources are used above a predetermined threshold. According to another example, the access point AP 110 decides to select the random selection method when said access point AP 110 notes that each of the terminals T connected to the wireless communication network 120, in a given time window, has made a number of accesses to the medium of the wireless communication network 120 above a predetermined threshold.

In yet another particular embodiment, the access point AP 110 uses by default the random selection method and selects the free selection method when a criterion for selection of statistics from said terminals T vis-à-vis a preference as to the frequency resources to be used is not met. In other words, the access point AP 110 decides to select the free selection method when said access point AP 110 considers that it needs more statistics with regard to the frequency resources that said mobile terminals prefer to use.

In yet another particular embodiment, the access point AP 110 uses by default the free selection method, and selects the random selection method when a criterion for collection of statistics from said mobile terminals T vis-à-vis a preference as to the frequency resources to be used is met. In other words, the access point AP 110 decides to select the random selection method when said access point AP 110 considers that it has collected sufficient statistics as to the frequency resources that said terminals prefer to use.

In yet another particular embodiment, the access point AP 110 uses the random selection method for a trigger frame TF-R when the number of terminals T to which said frame relates is greater than a certain predetermined threshold for a given number of frequency resources, and otherwise the access point AP 110 uses the free selection method for this trigger frame TF-R.

In yet another particular embodiment, the access point AP 110 uses the free selection method for terminals T infrequently accessing the medium of the wireless communication network 120, i.e. the frequency of access of which to said medium is below a predetermined threshold.

In yet another particular embodiment, the access point AP 110 uses the free selection method for terminals T the reception signal level of which (of uplink frames sent by said terminals) is below a predetermined threshold (long range).

In yet another particular embodiment, the access point AP 110 uses the free selection method for terminals T the battery level of which is below a certain threshold (if said terminals transmit to the access point AP 110 messages indicating when their respective batteries pass below a predetermined threshold), or where the association time in the wireless communication network 120 and the number of uplink transmissions are higher than a predetermined threshold.

In yet another particular embodiment, the access point AP 110 uses the random selection method for low-priority traffic types and the free selection method for traffic types with a higher priority (use of the QoS indicator for example in order to take the difference between the traffics).

In yet another particular embodiment, the access point AP 110 uses the random selection method for addressing all the terminals T in the wireless communication network 120 in a broadcast mode.

In yet another particular embodiment, the access point AP 110 uses the random selection method for terminals not forming part of the wireless communication network 120 in order to give them the opportunity to send messages not requiring belonging to said wireless communication network (of the information request type such as for example "probe request" or a radio measurement request), the free selection method remaining dedicated to terminals T belonging to the wireless communication network 120.

In a particular embodiment, the access point AP 110 defines a specific selection method for each terminal T for which the coordinated random access trigger frame TF-R is intended. This enables enhancing the statistics relating to the frequency resource free selections, specifically for certain terminals T (for example because said statistics are sufficiently rich for the other terminals T in question).

In a step 304, the access point AP 110 determines a set of candidate frequency resources for the OFDMA uplink transmissions able to follow the transmission of the coordinated random access trigger frame TF-R. These frequency resources are not necessarily contiguous in the frequency spectrum of use of the wireless communication network 120. The access point AP 110 can use predefined sets of candidate frequency resources and select one set among said predefined sets of candidate frequencies, for example in accordance with a rule of fairness of use of the whole of the frequency spectrum of use of the wireless communication network 120. The access point AP 110 can also adjust the set of candidate frequency resources to be submitted to the terminals T for making said OFDMA uplink transmissions, according to the terminals T for which the coordinated random access trigger frame TF-R is intended. This aspect is detailed below in relation to FIG. 6.

In an optional step 305, the access point AP 110 determines which modulation and coding scheme MCS said terminals T are supposed to use for the OFDMA uplink transmission able to follow the transmission of the coordinated random access trigger frame TF-R.

In a variant, the access point AP 110 determines which least robust modulation and coding scheme MCS is supported by said access point AP 110 for the OFDMA uplink transmissions that can follow the transmission of the coordinated random access trigger frame TF-R. Each terminal T making an OFDMA uplink transmission in response to said coordinated random access trigger frame TF-R is then enabled to use a modulation and coding scheme MCS at least as robust as the one determined here by the access point AP 110. In other words, each said terminal T is then enabled to choose a modulation and coding scheme MCS (from among those predefined for the wireless communication network 120) the spectral efficiency of which (a product of the order of the modulation (number of bits per modulation symbol) and of the correcting code efficiency (the ratio of the number of useful bits to the number of bits in total)) is lower than or equal to the spectral efficiency of the least robust modulation and coding scheme MCS supported by said access point AP 110 for the OFDMA uplink transmissions that can follow said coordinated random access trigger frame TF-R.

In another variant, the access point AP 110 determines which modulation said terminals T are supposed to use for the OFDMA uplink transmissions in response to the transmission of the coordinated random access trigger frame TF-R, and leaves the choice of the correcting code efficiency to said terminals T. The access point AP 110 then merely has to adapt its decoding stage to the efficiency of the error correcting code; since the variability in the error correcting code is obtained by means of puncturing, this is simpler to achieve in practice than changes in modulation, in particular for convolutional codes and codes of the LDPC (low density parity check) type.

Modulation and coding schemes MCS are typically represented by indexes in a table listing all the modulation and coding schemes MCS that can be used in the context of communications in the wireless communication network 120. Each modulation and coding scheme MCS defines a modulation, e.g. BPSK (binary phase shift keying) or QPSK (quadrature phase shift keying) or QAM (quadrature amplitude modulation), as well as error correcting code efficiency, e.g. 1/3 or 1/2 or 2/3, used for making the transmission in question. The higher the error correcting code efficiency and the order of the modulation, the greater the quantity of useful information transmitted (proportional to the product of the previous two quantities). According to IEEE 802.11ax, the modulation and coding scheme MCS is represented by indexes that may vary from 0 (BPSK, efficiency 1/2) to 11 (1024-QAM, efficiency 5/6). In general terms, the higher the index representing the modulation and coding scheme MCS, the greater the quantity of useful information transmitted. On the other hand, the higher the index representing the modulation and coding scheme MCS, the less robust is the modulation and coding scheme MCS.

In a particular embodiment, rather than determining a single modulation and coding scheme MCS for all the candidate frequency resources determined at step 304, the access point AP 110 determines a specific modulation and coding scheme MCS for each candidate frequency resource determined at step 304.

In a step 306, the access point AP 110 determines what downlink transmission power will be used by said access point 110 for transmitting the coordinated random access trigger frame TF-R. This transmission power can be defined by default. This transmission power can also be adjusted by the access point AP 110, according to criteria that are particular to it, for example in order not to exceed a certain radio signal range. What is important is to ensure that each terminal T receiving the coordinated random access trigger frame TF-R which is intended for it can, according to a received signal power in reception of said coordinated random access trigger frame TF-R, determine a signal attenuation level caused by the transmission from the access point AP 110 to said terminal T. The transmission power used by the access point AP 110 can thus be predefined (potentially broadcast in beacons transmitted by the access point AP 110) and known to the terminals T connected to the wireless communication network 120, rather than being transmitted in the coordinated random access trigger frame TF-R itself.

The downlink transmission power can thus be defined for all the frequency resources on which said coordinated random access trigger frame TF-R will be transmitted. In a variant, the downlink transmission power is thus defined for each of the frequency resources on which said coordinated random access trigger frame TF-R will be transmitted, if the power is not distributed uniformly over all the subcarriers. In another variant, the downlink transmission power is thus defined for a single frequency resource: this downlink transmission power is then valid for each of said frequency resources when said frequency resources are of identical sizes, or a predefined scale factor enables deriving the downlink transmission power for each of said frequency resources when said frequency resources are of different sizes from each other.

In an optional step 307, the access point AP 110 determines a reception power expected for the OFDMA uplink transmissions able to follow the transmission of the coordinated random access trigger frame TF-R. This will enable each terminal T receiving the coordinated random access trigger frame TF-R when said frame is intended for it to determine, by virtue of the knowledge of the signal attenuation level caused by the transmission from the access point 110 to said terminal T and by virtue of the radio channel reciprocity principle, what transmission power to use to perform an OFDMA uplink transmission in the context of the coordinated random access. What is important is to ensure that each channel T having to perform an OFDMA uplink transmission in the context of coordinated random access can determine what transmission power to use. The minimum reception power required by the access point AP 110 can thus be predefined (potentially broadcast in beacons transmitted by the access point AP 110) and known to the mobile terminals T connected to the wireless communication network 120, rather than being transmitted in the coordinated random access trigger frame TF-R itself.

The expected reception power can thus be defined for a single candidate frequency resource: this expected reception power is then valid for each of said candidate frequency resources when said candidate frequency resources are of identical sizes, or a predefined scale factor enables deriving the expected reception power for each of said candidate frequency resources when said frequency resources are of different sizes from each other. In a variant, the expected reception power is thus defined for each of said candidate frequency resources.

In a step 308, the access point AP 110 constructs the coordinated random access trigger frame TF-R.

The access point AP 110 includes therein information identifying each terminal T revealed by step 302, as well as information identifying the candidate frequency resources revealed by step 304.

The access point AP 110 further includes therein information identifying the frequency resource selection method which is to be applied by the terminals T for which the coordinated random access trigger frame TF-R is intended, as determined at step 303.

If the transmission power that will be used by the access point AP 110 for transmitting the coordinated random access trigger frame TF-R is not now known to the terminals T, the access point AP 110 further includes, in said coordinated random access trigger frame TF-R, information representing the transmission power that will be used by the access point AP 110, as already dealt with in relation to step 306.

If the minimum power expected by the access point AP 110 in receiving each OFDMA uplink transmission following said coordinated random access trigger frame TF-R is not now known to said terminals T, the access point AP 110 further includes, in said coordinated random access trigger frame TF-R, information representing the minimum power expected in reception of each said OFDMA uplink transmission, as already dealt with in relation to step 307. The access point AP 110 may in a variant include information representing a power range expected in reception, either by including information representing bounds of said range, or information representing a margin around a midpoint of said range, or any other way of representing said range.

In a particular embodiment, the access point AP 110 further indicates, in said coordinated random access trigger frame TF-R, what is the duration of enabling of coordinated random access for the OFDMA uplink transmissions following the reception of said coordinated random access trigger frame TF-R. In a variant, this duration may be fixed and now known to each of the devices connected to the wireless communication network 120.

In a particular embodiment, the access point AP 110 further includes, in said coordinated random access trigger frame TF-R, information representing an instant as from which the OFDMA uplink transmissions following said coordinated random access trigger frame TF-R are enabled to begin. In a variant, these OFDMA uplink transmissions are enabled to begin after a fixed time, now known to each of the devices connected to the wireless communication network 120, as from the reception of said coordinated random access trigger frame TF-R.

In a particular embodiment, the access point AP 110 further indicates, in said coordinated random access trigger frame TF-R, whether the access point AP 110 enables a message fragmentation in the OFDMA uplink transmissions in response to said coordinated random access trigger frame TF-R. This is because it is possible for a terminal T not to have enough radio resources (according to the frequency resources selected, the modulation and coding scheme MCS and the duration of the transmission opportunity) for transmitting a message in its entirety and thus divided into a plurality of fragments at the MAC (medium access control) layer, in order to send said message in pieces. The IEEE 802.11 family of standards provides a field of one bit, called "More Data", which takes the value 1 except for the last message fragment, for which this bit takes the value 0. In the case of fragmentation, the access point AP 110 is responsible for reassembling the non-fragmented original message, which requires that the access point AP 110 should have sufficient memory resources to do this. In a variant, the access point AP 110 further indicates, in said coordinated random access trigger frame TF-R, for each mobile terminal T concerned, whether the access point AP 110 enables a message fragmentation in the OFDMA uplink transmission that could take place in response to said coordinated random access trigger frame TF-R. This is because a prior negotiation between any terminal T and the access point AP 110 enables having different processing operations according to the terminals in question (for example, according to the maximum size of the message to be transmitted or according to the memory resources still available in the access point AP 110).

In a step 308, the access point AP 110 transmits the coordinated random access trigger frame TF-R constructed at step 307. The coordinated random access trigger frame TF-R is of level 2 (data link layer) in the OSI (Open Systems Interconnection) model. The transmission of the frame is preferentially of the OFDM type. If the access point AP 110 is not specified in the coordinated random access trigger frame TF-R constructed at step 307 with what power said coordinated random access trigger frame TF-R is transmitted, the access point AP 110 uses a default transmission power known to the terminal T; otherwise the access point AP 110 uses the transmission power indicated in said coordinated random access trigger frame TF-R. The algorithm in FIG. 3 is then ended.

In a particular embodiment, the access point AP 110 transmits the coordinated random access trigger frame TF-R via at least the frequency resources determined at step 304, i.e. the candidate frequency resources for the uplink transmissions of the OFDMA type able to follow said coordinated random access trigger frame TF-R. This means that the transmission of the coordinated random access trigger frame TF-R causes the presence of a signal, at layer 1 (the physical layer) of the OSI model, on these frequency resources by virtue of the physical layer preamble of said frames and/or the encoding of the data of the data link layer of said frame. This enables the terminals T at which said coordinated random access trigger frame TF-R is intended to evaluate, having knowledge of the transmission power used by said access point AP 110 and relying on the channel reciprocity principle, the attenuation actually taking place on each of said frequency resources. This aspect is detailed below in relation to FIG. 4.

This is the case in IEEE 802.11ax, the physical layer preamble typically contains a first subpart, which can be denoted SubCh, encoded on each 20 MHz channel (the unitary channel in the IEEE 802.11 family of standards) for reasons of retrocompatibility (e.g. SubCh includes the physical signals such as L-SIG according to IEEE 802.11ac for retrocompatibility with the terminals compatible with IEEE 802.11a/n), and a second part, which can be denoted Ch, encoded on all the channels made available (e.g. Ch includes the physical signals such as VHT-SIG-A according to IEEE 802.11ac. The coordinated random access trigger frame TF-R (the data link layer) can be encoded on all the channels made available or only on those comprising candidate frequency resources. In the case where the candidate frequency resources are distributed over a plurality of distinct channels, the coordinated random access trigger frame TF-R (the data link layer) can be repeated on each 20 MHz channel. In a variant, the coordinated random access trigger frame TF-R (the data link layer) may be encoded differently per channel or group of channels, indicating on each 20 MHz channel or group of 20 MHz channels the data relating to the candidate frequency resources belonging to said channel or group of channels. In another variant, the coordinated random access trigger frame TF-R (the data link layer) may be concatenated with one or more other MAC (medium access control) frames, following channel encoding rules of said other MAC frames, as long as all or part of the physical layer preamble and/or data link layer data is present on said candidate frequency resources.

The transmission of this coordinated random access trigger frame TF-R gives the opportunity for each terminal T identified in said coordinated random access trigger frame TF-R to perform, in response, an OFDMA uplink transmission, as described below in relation to FIG. 4.

Figure 4:
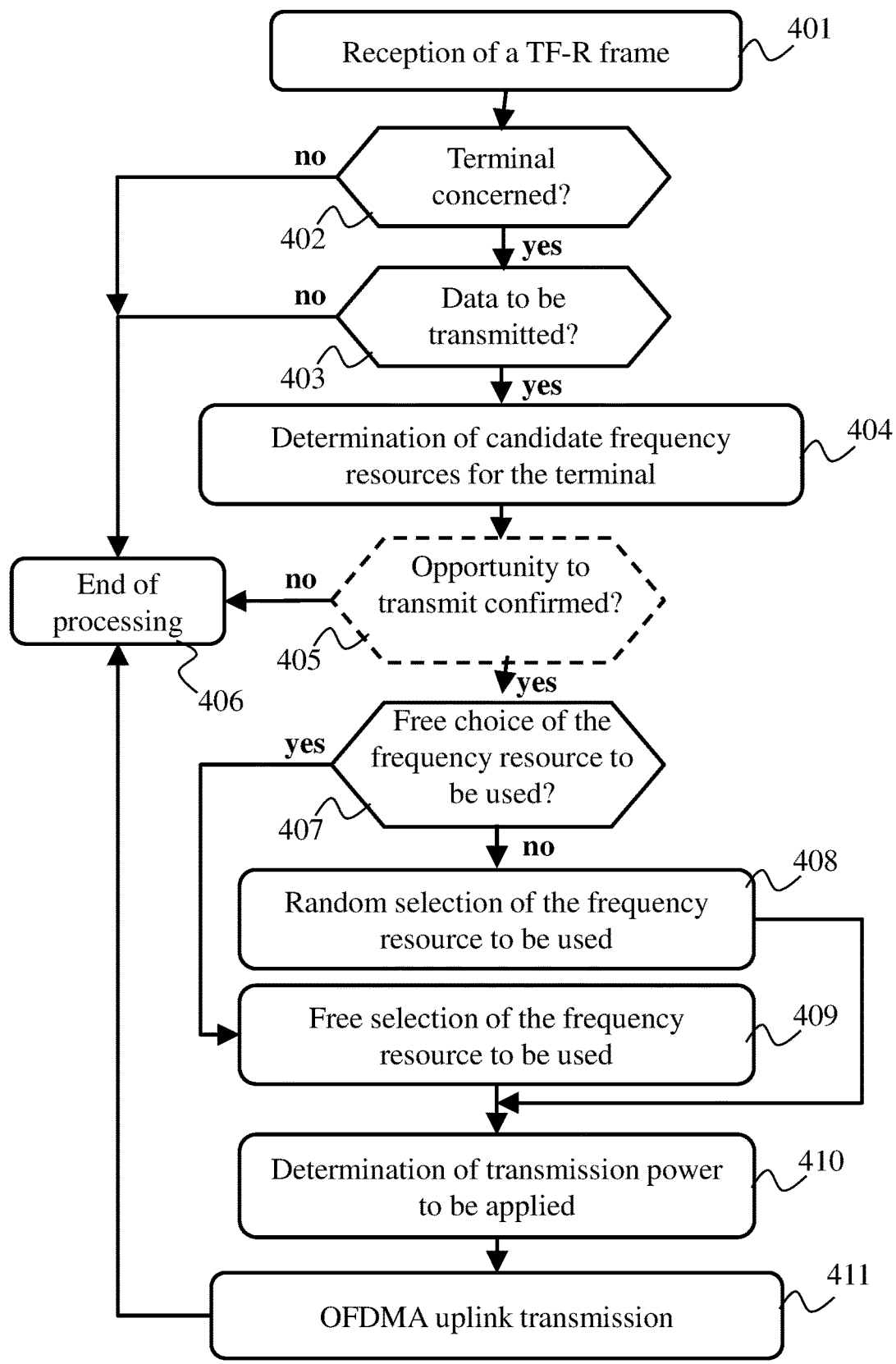
FIG. 4 illustrates schematically an algorithm, executed by at least one terminal in the wireless communication system, for benefitting from the coordinated random access procedure.

FIG. 4 illustrates schematically an algorithm, executed by at least one terminal T in the wireless communication system 120, for benefitting from the coordinated random access procedure initiated by the access point AP 110. Let us consider by way of illustration that the algorithm in FIG. 4 is executed by the mobile terminal T 111.

In a step 401, the mobile terminal T 111 receives the coordinated random access trigger frame TF-R transmitted by the access point AP 110 at step 308.

In a step 402, the terminal T 111 checks whether said terminal T 111 is identified in the coordinated random access trigger frame TF-R as being able to benefit from the coordinated random access procedure initiated by said coordinated random access trigger frame TF-R. If such is the case, a step 403 is performed; otherwise a step 406 is performed, in which the mobile terminal T 111 jettisons said coordinated random access trigger frame TF-R, and in which the algorithm of FIG. 4 is ended.

In step 403, the terminal T 111 checks whether said terminal T 111 has data to be transmitted in the context of the coordinated random access procedure initiated by said coordinated random access trigger frame TF-R. If such is the case, a step 404 is performed; otherwise step 406 is performed.

In step 404, the terminal T 111 identifies what are the candidate frequency resources, as indicated in said coordinated random access trigger frame TF-R, that said terminal T 111 is entitled to use for making an OFDMA uplink transmission in response to said coordinated random access trigger frame TF-R.

In an optional step 405, the mobile terminal T 111 checks whether the opportunity to perform an OFDMA uplink transmission in response to said coordinated random access trigger frame TF-R is confirmed. Step 405 is implemented when the terminals T of the wireless communication network 120 each use a mechanism, such as the OBO (for the record, "OFDMA backoff") counter in IEEE 802.11ax, which is manipulated each time a coordinated random access trigger frame TF-R is received, making it possible to distribute accesses to the medium fairly and in a distributed fashion between the terminals T over a plurality of successive coordinated random access procedures. When fairness of access to the medium is managed in a centralised manner by the access point AP 110, it is considered that, when a terminal T is identified in a coordinated random access trigger frame TF-R, said terminal T is entitled to access the medium in response to said coordinated random access trigger frame TF-R.

If the opportunity to perform an OFDMA uplink transmission in response to said coordinated random access trigger frame TF-R is confirmed, a step 407 is performed; otherwise step 406 is performed.

In step 407, the terminal T 111 identifies the frequency resource selection method that the terminal T 111 must apply in order to access the medium in the context of the coordinated random access procedure, as indicated by the access point AP 110 in the coordinated random access trigger frame TF-R. In other words, the terminal T 111 checks whether said terminal T 111 has a free choice of said frequency resource among the candidate frequency resources that are submitted to it by said access point AP 110 or whether said terminal T 111 must select said frequency resource randomly among said candidate frequency resources. If the choice of said frequency resource is left free to the terminal T 111 by the access point AP 110, a step 409 is performed; otherwise a step 408 is performed.

In step 408, the terminal T 111 performs a random selection of the frequency resource to be used by said terminal T 111 to access the medium in the context of the coordinated random access procedure, among the candidate frequency resources that are submitted to it by said access point AP 110. Then a step 410 is performed.

In step 409, the terminal T 111 performs a free selection of the frequency resource to be used by said terminal T 111 for accessing the medium in the context of the coordinated random access procedure, among the candidate frequency resources that are submitted to it by said access point AP 110. To do this, the terminal T 111 uses its own criteria, of which the access point AP 110 does not necessarily have to have knowledge. The terminal T 111 can sort and/or classify the candidate frequency resources according to said criteria in order to facilitate the frequency resource selection. Then step 410 is performed.

For example, the terminal T 111 uses, as the main selection criterion, attempting to satisfy the minimum reception power expected by the access point AP 110, while minimising the transmission power to be used for making the OFDMA uplink transmission. The terminal 111 can then effect a classification of the candidate frequency resources according to the required transmission power in order to satisfy the minimum reception power expected by the access point AP 110. The terminal T 111 then selects the frequency resource requiring the lowest power, a drawing of lots is carried out among said frequency resources, making a weighting of the probability of drawing each frequency resource according to its place in the classification (a first candidate frequency resource then being favoured compared with a second candidate frequency resource requiring a higher transmission power than said first frequency resource). The dynamic determination of the transmission power to be used for making an OFDMA uplink transmission is dealt with below in relation to step 410.

According to another example, the terminal T 111 uses, as the main selection criterion, attempting not to fragment a message to be transmitted in the context of the coordinated random access procedure. The terminal T 111 can exclude the candidate resources not allowing a transmission without fragmentation in the light of the modulation and coding scheme or schemes MCS enabled by the access point AP 110 vis-à-vis said candidate resources. The mobile terminal 111 can then select randomly a frequency resource among the remaining candidate frequency resources, or carry out a classification according to a second criterion, such as for example attempting to satisfy the minimum reception power expected by the access point AP 110, while minimising the transmission power to be used for making the OFDMA uplink transmission (as explained above). In a particular embodiment, when no candidate frequency resource enables performing the OFDMA uplink transmission without fragmenting the message, the mobile terminal T 111 uses the OFDMA uplink transmission to transmit a message to the access point AP 110 in order to indicate that the terminal T 111 cannot perform the OFDMA uplink transmission without fragmenting the message, so that the access point AP 110 can offer other candidate frequency resources and/or other modulation and coding schemes MCS applicable and/or enable fragmentation when the next frame triggering the coordinated random access procedure TF-R concerning the terminal T 111 is transmitted. This particular embodiment is also applicable when the access point AP 110 has indicated that it does not enable message fragmentation in the uplink transmissions made in response to said coordinated random access trigger frame TF-R.

In a particular embodiment in which the aforementioned OBO counter is used, when the terminal T 111 gains access to the medium (OBO counter zero) but no candidate frequency resource satisfies the selection criteria that the terminal T 111 has defined for itself, the terminal T 111 can decide not to perform an OFDMA uplink transmission in response to said coordinated random access trigger frame TF-R, and then to set its OBO counter to the value 1 in order to gain necessarily the opportunity to transmit on reception of the next coordinated random access trigger frame TF-R that is addressed to it. The terminal T 111 may also decide to choose to transmit despite everything on a frequency resource chosen randomly, or on the one that is closest to satisfying its selection criteria.

In step 410, the terminal T 111 determines a transmission power to use for making the OFDMA uplink transmission, via the frequency resource selected by the terminal T 111 at step 408 or at step 409, in the context of the coordinated random access procedure initiated by said coordinated random access trigger frame TF-R. The terminal T 111 can use a default transmission power value.

In a preferential embodiment, the terminal T 111 adjusts the transmission power in order to perform the OFDMA uplink transmission, at the frequency resource selected by the terminal T 111 at step 408 or at step 409, as well as at the minimum reception power expected by the access point AP 110. The terminal T 111 determines a signal attenuation level corresponding to said frequency resource. The terminal T 111 can rely on the reception signal level caused by the transmission of said coordinated random access trigger frame TF-R vis-à-vis said frequency resource, knowing the transmission power used by the access point AP 110 to transmit said coordinated random access trigger frame TF-R. The attenuation is then given by the difference between said transmission power used by the access point AP 110 vis-à-vis said frequency resource and said reception signal thereof (in decibels). Thus, knowing the attenuation and the minimum reception power expected by the access point AP 110, the terminal T 111 is capable of determining the transmission power to be used for making the OFDMA uplink transmission. The transmission power to be used for making the OFDMA uplink transmission is then the minimum reception power expected by the access point AP 110 plus said attenuation, plus optionally a predefined margin (in decibels).

In a step 411, the terminal T 111 performs the OFDMA uplink transmission in order to transmit to the access point AP 110 the data identified at step 403, via the frequency resource selected by the terminal T 111 at step 408 or at step 409, using the transmission power determined at step 410. The terminal T 111 typically waits for a period of time of predetermined duration after reception of said coordinated random access trigger frame TF-R before triggering said OFDMA uplink transmission. In the context of IEEE 802.11ax, this duration is defined by a parameter called SIFS (short inter-frame spacing) and is equal to 16 µs on the ISM (industrial, scientific and medical) radio band at 5 GHz for example. Another duration may be used, such as for example the one defined by another parameter of IEEE 802.11 called PIFS (PCF inter-frame spacing, where PCF means "point coordinated function"). Then step 406 is performed.

Figure 5:
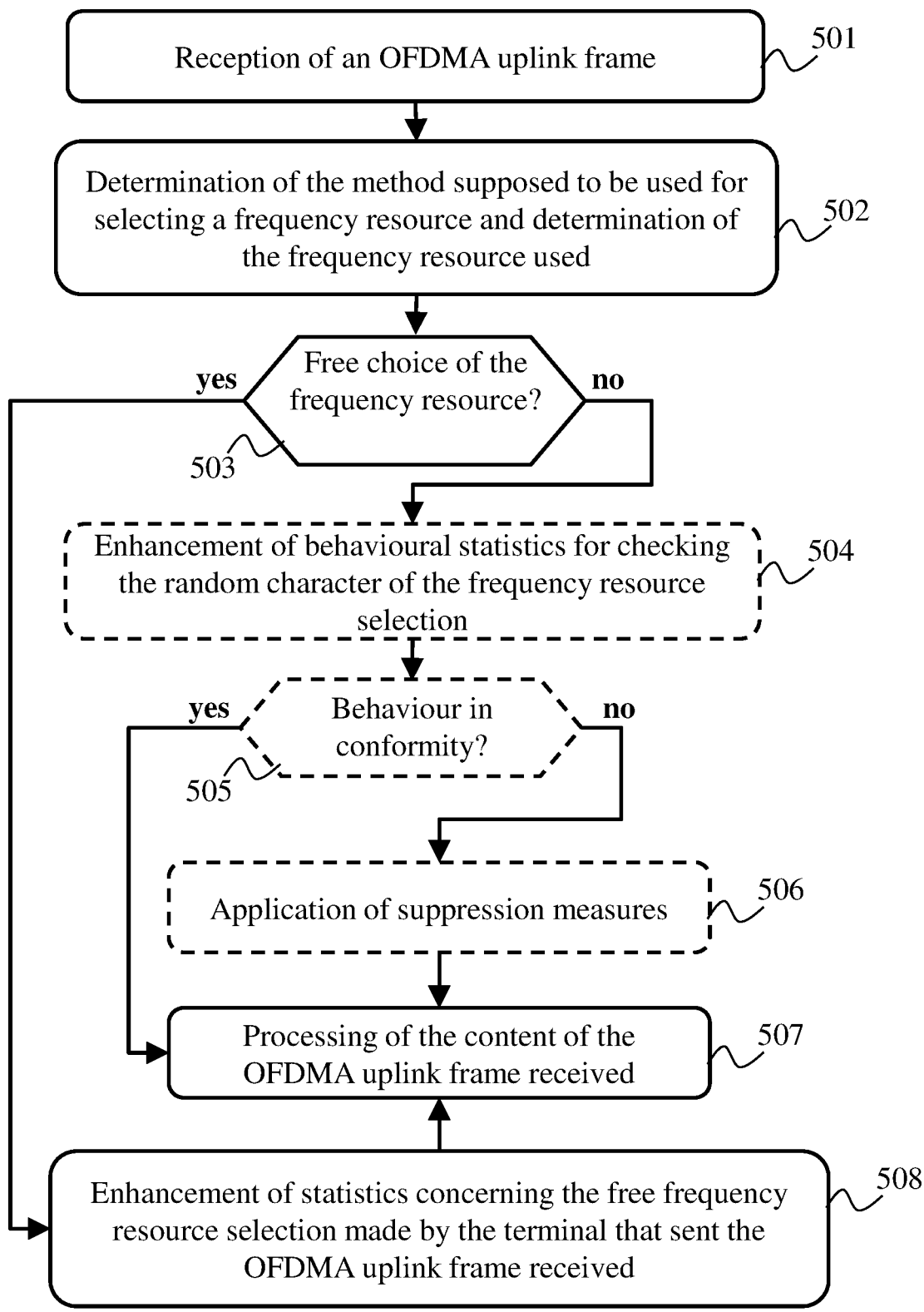
FIG. 5 illustrates schematically an algorithm, executed by the access point, on receiving an OFDMA uplink transmission in the context of the coordinated random access procedure.

FIG. 5 illustrates schematically an algorithm, executed by the access point AP 110, in reception of an OFDMA uplink transmission in the context of a coordinated random access procedure previously initiated by said access point AP 110. Let us consider by way of illustration that the coordinated random access procedure previously initiated by said access point AP 110 gave an opportunity to the terminal T 111 to perform an OFDMA uplink transmission and that the terminal T 111 has seized this opportunity.

In a step 501, the access point AP 110 receives an OFDMA uplink frame transmitted by the terminal T 111 in response to a coordinated random access trigger frame TF-R previously transmitted by the access point AP 110.

In a step 502, the access point AP 110 determines which frequency resource selection method is supposed to have been applied by the terminal T 111, as indicated by the access point AP 111 in the coordinated random access trigger frame TF-R that allowed the OFDMA uplink transmission made by the terminal T 111.

In a step 503, the access point AP 110 determines whether the frequency resource selection method supposed to have been applied by the terminal T 111 is the random selection method, in which case a step 504 is performed, or the free selection method, in which case a step 508 is performed.

In step 504, the access point AP 110 enhances the behavioural statistics relating to said terminal T 111 vis-à-vis the random character that the frequency resource selections made by said terminal T 111 over time are supposed to have when the access point AP 110 requests that the random selection method be used. For example, the access point AP 110 maintains, for each terminal T in the wireless communication network 120, a first counter C1 vis-à-vis each frequency resource that can be used by the OFDMA uplink transmissions in the context of the coordinated random access procedures. The access point AP 110 increments by one unit the first counter C1 associated with a frequency resource when said terminal T uses said frequency resource to perform an OFDMA uplink transmission in the context of a coordinated random access procedure based on a random frequency resource selection. These statistics may take other forms, such as for example a timestamped log of frequency resources used during the coordinated random access procedures based on random frequency resource selections.

In a step 505, the access point AP 110 checks whether the behaviour of the terminal T 111 is in conformity vis-à-vis the random character that the frequency resource selections made by said terminal T 111 over time are supposed to have when the access point AP 110 requests that the random selection method be used. Taking the aforementioned example of the first counters C1, the access point AP 110 checks over time that the values of said first counters C1 associated with said terminal T 111 are substantially homogeneous with each other, i.e. that these values do not have any disparities less than a given threshold TH1. If the behaviour of the terminal T 111 is in conformity, a step 507 is performed, in which the access point AP 110 processes the data that were transmitted by the terminal T 111 in the context of the OFDMA uplink transmission, and the algorithm in FIG. 5 is ended; otherwise a step 506 is performed.

In step 506, the access point AP 110 takes suppression measures vis-à-vis the terminal T 111, considering that the terminal T 111 uses a biased random number generator. The access point AP 110 can also have recourse to a third-party authority, responsible for taking the suppression measures or dictating to the terminal T 111 what suppression measures to apply. These suppression measures are for example preventing or limiting exchanges with the terminal T 111 in the wireless communication network 120 at least for a predetermined period.

All the steps 504, 505 and 506 are optional in that the point AP 110 cannot check that the random character of the selections made by the mobile terminal 111, when said terminal 111 is supposed to apply the random selection method, is actually complied with.

In step 508, the access point AP 110 enhances statistics relating to said terminal T 111 vis-à-vis the use of the frequency resources that can be used by the uplink transmissions in the context of the coordinated random access procedures when the access point AP 110 requests that the preselection method be used. For example, the access point AP 110 maintains, for each terminal T in the wireless communication network 120, a second counter C2 vis-à-vis each frequency resource that could be used by the OFDMA uplink transmissions in the context of the coordinated random access procedures. The access point AP 110 increments by one unit the second counter C2 associated with a frequency resource when said terminal T uses said frequency resource to perform an OFDMA uplink transmission in the context of a coordinated random access procedure based on a free frequency resource selection. These statistics may take other forms, such as for example a timestamped log of the frequency resources used during coordinated random access procedures based on free frequency resource selections.

As already indicated, the access point AP 110 does not necessarily need to know what motivates the terminal T 111 in choosing such and such a frequency resource among the candidate frequency resources that the access point AP 110 offers to it in the coordinated random access procedure trigger frames TF-R. It is however advantageous for the access point AP 110 to be able to determine, by means of said statistics, which frequency resource or resources to favour subsequently for the terminal T 111 in the context of the subsequent coordinated random access procedures. These aspects are detailed hereinafter in relation to FIGS. 6 and 7. Next, step 507 is performed.

FIG. 6 illustrates schematically an algorithm, executed by the access point AP 110 for selecting candidate frequency resources to be submitted to a terminal T in the context of a coordinated random access procedure. Let us consider by way of illustration that the access point AP 110 considers the terminal 111.

In a step 601, the access point AP 110 obtains statistics relating to the terminal T 111 vis-à-vis the use of the frequency resources that can be used by the uplink transmissions in the context of the coordinated random access procedures when the access point AP 110 requests that the free selection method be used. These statistics are the ones that the access point AP 110 enhances in step 508 at each reception of an OFDMA uplink transmission for which the access point AP 110 has requested said terminal 111 to use the free selection method in the coordinated random access trigger frame TF-R that enabled said OFDMA uplink transmission.

In a step 602, the access point AP 110 determines whether a condition is fulfilled for the statistics obtained at step 601 to be able to be considered to be sufficient. Such a condition is for example that a certain amount of time has elapsed since the start of the collection of said statistics, or that a certain number of coordinated random access procedures have been initiated since the start of collection of said statistics, or that a certain number of coordinated random access procedures have been initiated and actually entered by the terminal T 111 since the start of collection of said statistics. If the statistics obtained at step 601 are considered to be sufficient, a step 604 is performed; otherwise a step 603 is performed.

In step 603, the access point AP 110 uses a predefined selection of frequency resources to be submitted to the terminal T 111 in the context of the coordinated random access procedure in question. For example, the access point AP 110 regularly changes a predefined selection of frequency resources along with the coordinated random access procedures, so as to be able to collect sufficient statistics vis-à-vis the mobile terminal T 111 on all the frequency resources that can be used by the OFDMA uplink transmissions in the context of the coordinated random access procedures.

In step 604, the access point AP 110 uses a selection of frequency resources to be submitted to the terminal T 111 in the context of the coordinated random access procedure in question, relying on the statistics obtained at step 601. More precisely, the access point AP 110 submits to the terminal T 111 at least the frequency resource that is preferred by the terminal T 111 according to said statistics. This approach is particularly suitable for an application of the free selection method. Taking the example of the second counter C2 introduced in relation to FIG. 5, the access point AP 110 selects at least the frequency resource for which the value of the second counter C2 is the highest, or, in a variant, the N (N>1) frequency resources for which the respective values of their second counters C2 are the highest. The latter approach is suited both to an application of the free selection method and to an application of the random selection method. Step 604 can be performed whether for coordinated random access procedures wherein the frequency resource selection by the terminal T 111 is random, or for coordinated random access procedures wherein the frequency resource selection by the terminal T 111 is free.

FIG. 7 illustrates schematically an algorithm, executed by the access point AP 110, for effecting groupings of terminals T in the context of the coordinated random access procedure. When the access point AP 110 transmits a coordinated random access trigger frame TF-R, said coordinated random access trigger frame TF-R is intended for each terminal in a said group.

In a step 701, the access point AP 110 obtains statistics relating to the terminals T connected to the wireless communication network 120 vis-à-vis the use of the frequency resources that can be used by the uplink transmissions in the context of the coordinated random access procedures when the access point AP 110 requests that the free selection method be used. These statistics are those that the access point AP 110 enhances in step 508 at each reception of an OFDMA uplink transmission for which the access point AP 110 has requested using the free selection method in the coordinated random access trigger frame TF-R that enabled said OFDMA uplink transmission.

In a step 702, the access point AP 110 determines whether a condition is fulfilled for the statistics obtained at step 701 to be able to be considered to be sufficient. Such a condition is for example that a certain amount of time has elapsed since the start of collection of said statistics, or that a certain number of coordinated random access procedures have been initiated since the start of collection of said statistics, or that a certain number of coordinated random access procedures have been initiated and actually entered by the terminals since the start of collection of said statistics. If the statistics obtained at step 701 are considered to be sufficient, a step 704 is performed; otherwise a step 703 is performed.

In step 703, the access point AP 110 uses predetermined groupings of terminals T connected to the wireless communication network 120. These predetermined groupings can be made up according to respective functionality types implemented by the terminals T connected to the wireless communication network 120. For example, the access point AP 110 can effect a grouping of terminals T generating traffic related to the Internet of Objects IoT. In another example, the access point AP 110 can effect a grouping of terminals T generating traffic having similar characteristics (same periodicity of transmission, same QoS generally observed in the messages sent, etc.). In a variant, the access point AP 110 uses random groupings of terminals T among the terminals T connected to the wireless communication network 120.

In step 704, the access point AP 110 effects groupings of terminals T connected to the wireless communication network 120, relying on the statistics obtained at step 701. More precisely, the access point AP 110 effects these groupings so that the terminals T grouped together have frequency resource preferences, to be used in the context of OFDMA uplink transmissions, which are as distinct as possible. A similar approach is that the access point AP 110 effects these groupings so that the terminals T have frequency resource preferences, to be used in the context of OFDMA uplink transmissions, that are identical are placed in distinct groupings. This enables limiting occurrences of collision in the case of free frequency resource selection in the context of the coordinated random access procedure.

It can be considered that the coordinated random access procedure described above in relation to FIGS. 1 to 7 is supported by all the devices connected to the wireless communication network 120. A dynamic learning of the compatibility or not of the devices connected to the wireless communication network 120 vis-à-vis the coordinated random access procedure can also be considered. So as to enable synchronising the devices connected to the wireless communication network 120, each access point in a wireless communication network typically transmits beacons at regular intervals. The access point AP 110 can indicate in said beacons that it is able to trigger the coordinated random access procedures and optionally which selection method (random, free) said access point AP 110 supports. The access point AP 110 can also indicate, in these beacons, information representing future instants of transmission of a coordinated random access procedure trigger frame TF-R. This may be indicated for example by a period after the reception of said beacon or a reference instant and a periodicity. The access point AP 110 can also indicate that it is able to trigger coordinated random access procedures, in response to any probe request that is addressed to it. Each terminal T may also indicate that it supports the coordinated random access procedures, and optionally which selection method or methods (random, free) said terminal supports, by inserting corresponding information in each probe request addressed to the access point AP 110 or each association or reassociation request addressed to the access point AP 110.

Each terminal T may also warn the access point AP 110, after association, that said terminal T now wishes to communicate in a favoured manner by means of the coordinated random access procedure: a specific frame, called Random Access Only Request, is then sent by said terminal T; the access point AP 110 confirms reception of the instructions from said terminal T, either by an acknowledgement of the frame received (on the basis of a frame Ack or BlockAck, as defined in the IEEE 802.11 family of standards), or by a dedicated message, called Random Access Only Response. The access point AP 110 has the possibility of refusing the request from said terminal T or deferring the taking into account thereof, preferentially warning said terminal T. In the case of confirmation, the access point AP 110 can also inform said terminal T of the frequency of occurrence of the transmissions of the coordinated random access procedure trigger frames TF-R. In the case of an absence of response, said terminal T considers that its request has not been taken into account.

In an equivalent manner, each terminal T can also warn the access point AP 110, after association, that said terminal T no longer wishes to communicate in a favoured manner by means of the coordinated random access procedure: a specific frame, called Random Access Only Cancel, is then sent by said terminal T; the access point AP 110 confirms reception of the instructions from said terminal T, either by an acknowledgement of the frame received (on the basis of a frame Ack or BlockAck, as defined in the IEEE 802.11 family of standards), or by a dedicated message, called Random Access Cancel Confirm.

In the above description in relation to FIGS. 1 to 7, the access point AP 110 is not concerned with the criteria used by each terminal T for freely selecting a frequency resource, among the candidate frequency resources submitted by the access point AP 110, in order to perform an OFDMA uplink transmission in the context of a coordinated random access procedure. It is however possible for the access point AP 110 to impose a choice criterion or a choice rule on said terminals T. The access point AP 110 then includes, in the coordinated random access procedure trigger frame TF-R in question, information representing the choice criterion (or the choice rule) imposed by the access point AP 110. The access point AP 110 can impose choice criteria (or choice rules) on the terminals T that are different from each other. For example, the access point AP 110 can request a terminal T obtaining opportunity of access to the medium following reception of the coordinated random access procedure trigger frame TF-R to favour minimisation of the transmission power of said terminal in its frequency resource selection, in order to limit potential interferences towards other wireless communication networks.

The invention claimed is:

1. A method implemented by an access point of a wireless communication network to which a plurality of terminals are connected, the access point transmitting in the wireless communication network frames triggering coordinated random access procedure, each frame triggering coordinated random access procedure offering an opportunity for access to a medium of said wireless communication network to each terminal for which said frame is intended, each terminal that seizes said opportunity for access to the medium performing an Orthogonal Frequency Division Multiple Access (OFDMA) uplink transmission toward said access point in response to said frame, wherein the method comprises:
   including, by the access point, in each frame triggering coordinated random access procedure, information representing a method of selecting a frequency resource, chosen by said access point according to a predefined policy, among the following two:
   a random selection method, according to which each terminal concerned is supposed to randomly select a frequency resource among a set of candidate frequency resources submitted by said access point in said frame triggering coordinated random access procedure; and
   a free selection method, according to which each terminal concerned is supposed to freely select a frequency resource among a set of candidate frequency resources submitted by said access point in said frame triggering coordinated random access procedure.

2. The method according to claim 1, wherein the access point further includes, in each frame triggering coordinated random access procedure, information representing a power of transmission of said frame by said access point.

3. The method according to claim 1, wherein the access point further includes, in each frame triggering coordinated random access procedure, information representing a transmission power expected by said access point in receiving each OFDMA uplink transmission performed in response to said frame.

4. The method according to claim 1, wherein the access point transmits each frame triggering coordinated random access procedure at least via the candidate frequency resources submitted in said frame and among which the terminals for which said frame is intended are supposed to perform the frequency resource selection in order to perform the OFDMA uplink transmissions in response to said frame.

5. The method according to claim 1, wherein the access point further includes, in each frame triggering coordinated random access procedure, information representing the least robust modulation and coding scheme allowed by said access point for making each OFDMA uplink transmission in response to said frame.

6. The method according to claim 1, wherein the access point collects first statistics relating to the resources selected by said mobile terminals for performing the OFDMA uplink transmissions in response to the frames triggering coordinated random access procedure which include information representing the free selection method.

7. The method according to claim 6, wherein the access point determines the candidate frequency resources submitted in each frame triggering coordinated random access procedure, according to said first statistics collected vis-à-vis terminals for which said frame triggering coordinated random access procedure is intended.

8. The method according to claim 6, wherein the access point performs a grouping of terminals for which a frame triggering coordinated random access procedure is intended, according to said first statistics collected vis-à-vis terminals connected to the wireless communication network.

9. The method according to claim 1, wherein the access point collectssecond statistics relating to the resources selected by said terminals for performing the OFDMA uplink transmissions in response to the frames triggering coordinated random access procedure which include information representing the random selection method.

10. The method according to claim 9, wherein the access point checks that the selections of frequency resources for performing the OFDMA uplink transmissions in response to the frames triggering coordinated random access procedure which include information representing the random selection method actually have a random character.

11. The method according to claim 1, wherein the access point further includes, in each frame triggering coordinated random access procedure for which the access point has chosen the free selection method, information representing a selection rule, among a predefined set of selection rules, that each terminal concerned is supposed to apply for freely selecting one said frequency resource among the set of candidate frequency resources submitted by said access point in said frame triggering coordinated random access procedure.

12. The method according to claim 1, wherein the access point indicates, in beacons sent by the access point for synchronizing the wireless communication network, that the access point is able to trigger coordinated random access procedures.

13. The method according to claim 12, wherein the access point indicates, in the beacons sent by the access point for synchronizing the wireless communication network, information representing future instants of transmission of a frame triggering coordinated random access procedure.

14. A non-transitory information storage medium storing a computer program comprising instructions for implementing, by a processor of an access point of a wireless communication network to which a plurality of terminals are connected, when said program is executed by said processor, a method in which the access point transmits in the wireless communication network frames triggering coordinated random access procedure, each frame triggering coordinated random access procedure offering an opportunity for access to a medium of said wireless communication network to each terminal for which said frame is intended, wherein the method comprises:

including, by the access point, in each frame triggering coordinated random access procedure, information representing a method of selecting a frequency resource, chosen by said access point according to a predefined policy, among the following two:

a random selection method, according to which each terminal concerned is supposed to randomly select a frequency resource among a set of candidate frequency resources submitted by said access point in said frame triggering coordinated random access procedure, so that the terminal that seizes the opportunity for access to the medium performs an Orthogonal Frequency Division Multiple Access (OFDMA) uplink transmission toward said access point in response to said frame using said randomly selected frequency resource; and a free selection method, according to which each terminal concerned is supposed to freely select a frequency resource among a set of candidate frequency resources submitted by said access point in said frame triggering coordinated random access procedure, so that the terminal that seizes the opportunity for access to the medium performs an Orthogonal Frequency Division Multiple Access (OFDMA) uplink transmission toward said access point in response to said frame using said freely selected frequency resource.

15. An access point intended to manage a wireless communication network to which a plurality of terminals are connected, the access point being configured to transmit in the wireless communication network frames triggering coordinated random access procedure, each frame triggering coordinated random access procedure offering an opportunity for access to a medium of said wireless communication network to each terminal for which said frame is intended, each terminal that seizes said opportunity for access to the medium performing an (OFDMA) uplink transmission toward said access point in response to said frame, wherein the access point comprises:

processing circuitry configured to include, in each frame triggering coordinated random access procedure, information representing a frequency resource selection method, chosen by said access point according to a predefined policy, among the following two:

a random selection method according to which each terminal concerned is supposed to randomly select a frequency resource among a set of candidate frequency resources submitted by said access point in said frame triggering coordinated random access procedure; and a free selection method, according to which each terminal concerned is supposed to freely select a frequency resource among a set of candidate frequency resources submitted by said access point in said frame triggering coordinated random access procedure.

* * * * *